United States Patent [19]
Pont

[11] 3,921,753
[45] Nov. 25, 1975

[54] AIR CUSHION VEHICLE

[76] Inventor: Dominique Etienne Louis Pont, Villa "Ker Alguy", 1 rue de Kerpape, 56 260 Larmor Plage, France

[22] Filed: Aug. 5, 1974

[21] Appl. No.: 495,045

[30] Foreign Application Priority Data
Aug. 7, 1973  France .............. 73.28760

[52] U.S. Cl. .............. 180/127; 180/128
[51] Int. Cl.² .............. B60V 1/16
[58] Field of Search .......... 180/127, 128, 124, 125, 180/126

[56] References Cited
UNITED STATES PATENTS

| | | | |
|---|---|---|---|
| 3,260,323 | 7/1966 | Henry | 180/128 |
| 3,288,236 | 11/1966 | Padial | 180/126 |
| 3,327,799 | 6/1967 | Guienne et al. | 180/128 X |
| 3,400,779 | 9/1968 | Grace | 180/127 X |
| 3,478,836 | 11/1969 | Eckered | 180/128 |
| 3,502,168 | 3/1970 | Jones | 180/124 X |
| 3,621,932 | 11/1971 | Hythe | 180/126 |
| 3,756,343 | 9/1973 | Joyce | 180/127 |
| 3,783,965 | 1/1974 | Wright | 180/125 X |
| 3,827,527 | 8/1974 | Bertelsen | 180/124 X |

FOREIGN PATENTS OR APPLICATIONS
1,110,068  4/1968  United Kingdom............ 180/127

*Primary Examiner*—Leo Friaglia
*Assistant Examiner*—John P. Silverstrim
*Attorney, Agent, or Firm*—Larson, Taylor and Hinds

[57] ABSTRACT

An air cushion vehicle having a flexible skirt formed of downwardly extending, preferably rearwardly inclined finger-like projections. In the front portion of the vehicle the individual projections are interconnected by aprons; and in the rear portion of the vehicle the projections are preferably interconnected at their upper ends to a common horizontally extending compartment which is in turn rigidly connected to the vehicle.

11 Claims, 5 Drawing Figures

AIR CUSHION VEHICLE

BACKGROUND OF THE INVENTION

This invention relates to air cushion vehicles of the type in which suspension above the surface is effected by at least one air cushion under pressure, which cushion is formed at least in part by a flexible skirt. The present invention is especially suitable for high tonnage vehicles of the present type.

Presently known flexible skirts for vehicles of the present type are especially suitable for low tonnage vehicles only. In fact, simple logic would seem to lead to the proposal that the radii of curvature of the flexible skirts should increase with the linear dimensions of the vehicle. Stresses in the fabric of the flexible skirts and in their attachments to the rigid structure vary in proportion to the tonnage due to the pressure of the suspending air and to hydrodynamic shocks (actual impacts and scooping of water when riding over waves). Since the modulus of elasticity of the constituent materials of the skirts may not vary except as between different materials (and the choice of materials is quite limited) the thickness of the skirt must increase quite rapidly in proportion to the increase in the size of the vehicle and as the thickness in fact increases it becomes stiffer and more brittle, thus opposing the very purpose of the flexible skirts. This problem is especially pronounced if the vehicle must travel at sea whereupon the hydrodynamic shocks become very hard and scooping of the water, especially at the back of the air cushion tends to cause stresses which rupture or tear the skirts.

Hence, there is a need for an improved skirt construction especially suitable for high tonnage air cushion vehicles.

SUMMARY OF THE INVENTION

Hence, it is an object of the present invention to provide a system of flexible skirts capable of withstanding with flexibility rough seas which are encountered by high tonnage vehicles using small dimension flexible elements whereby the characeristic of flexibility can be maintained while still providing sufficient strength for the high tonnage load.

Another object of the invention consists in providing a flexible skirt system with inflatable elements whereof the relatively low inflation pressure is judiciously selected so that the said system gives way to the least stress on passage of a wave and rapidly then returns to its initial position, with the result that there is a good compromise between resistance to the advance of the vehicle and consumption of suspending air.

Skirts with inflatable elements have already been proposed, to improve the parameters of elasticity. Thus in French Pat. No. 1,517,469 it is proposed to place an inflatable bladder at the front of the vehicle, behind the actual skirt, to accelerate reestablishment of the form of the skirt after a sizeable deformation thereof, caused by a wave. However the standard skirt with distinct undulations or "fingers" is preserved throughout the lower part of the skirt, for which there exist the above noted problems. The same principle of inflatable elements disposed at the top of a skirt with lower fingers is described in French Pat. No. 1,552,655 and in the published French patent application No. 2,073,301. Increasing the flexibility of the skirt toward the bottom is thus obtained. On the other hand, all the inflatable elements include air openings into the air cushion area for providing suspension. Such skirts are obviously therefore of complex manufacture.

An object of the invention consists in the provision of a system of skirts with inflatable elements in the form of finger-like projections wherein the inflatable projections reach the bottom of the skirt.

According to a characteristic of the invention, a ground effect air cushion vehicle is provided wherein suspension is ensured by at least one pressurized air cushion, the cushion/cushions being at least partly defined by flexible skirts, said skirts comprising parts, whereof the forward part of the vehicle is composed at least in part of a row of aligned projections disposed vertically and inflated to a pressure greater than the pressure of the adjacent air cushion, said inflatable projections being interconnected by tangent aprons.

In a previously known technique, use was made of inflated elements to impart a certain stiffness to the form of the envelope of the air cushion. Thus in U.S. Pat. No. 3,248,086 a double wall envelope of the air cushion is provided, between which walls air is blown to form a sustaining cushion. However, such a structure is not sufficiently flexible horizontally, and it is not suitable for a vehicle that is supposed to move above waves. In French Pat. No. 1,421,331 there is the description of a skirt for an air cushion vehicle which presents an angle, the skirt being combined with a flexible foot opposing the tendency of this skirt to take a circular form, the said foot being inflatable and conical. However, this foot is not part of the actual skirt and does not comprise an apron joining it to the vehicle of the structure. Finally, if the vehicle has several feet, they are not disposed side by side.

One of the essential advantages of the present invention lies in the fact that the flexible structure of the skirt is effected by juxtaposition of numerous finger-like projections of small size and with small radii of curvature, each projection being required to withstand only relatively limited stresses.

According to another characteristic of the present invention, each inflated projection is generally truncated in form, reducing in cross-section toward the bottom, the large upper base being fixed to a rigid portion of the vehicle, and each tangent apron between two inflated projections being joined to said inflated projections along a generatrix and having a surface which is substantially larger than a fictitious straight surface between two juxtaposed projections, so that the apron forms an undulation between the two projections, convex toward the outside of the skirt, from the pressure of the air cushion.

According to another characteristic, each inflated projection is slightly inclined toward the inside of the said air cushion/cushions so as to diminish resistance to advance.

According to another characteristic, certain aprons are extended toward the interior of the skirt beyond generatrixes along which they are joined to adjacent projections, to be additionally joined to the rigid bottom of the vehicle structure.

Thus, in the system of the invention the inflated projections give a variable flexibility, the aprons disposed between them ensuring the seal of the air cushion and, further, the aprons joined to the rigid structure prevent ejection of the skirt to the outside, from internal pressure. However, though this system allows resolution of the problem of the front part of the skirt of a vehicle of high tonnage, the rear part that is subject to the scooping phenomenon must likewise be considered.

Consequently another object of the invention consists in provision of a skirt system that allows reduction of the scooping, and especially of the spoon effect of the back part of the skirt.

Solutions of the problems involved in scooping have already been described in published French patent application Nos. 2,044,633 and 2,125,147. In the former, a skirt is proposed that is formed by two superposed flaps that can slide on each other, while in the latter the skirt comprises several indentations that are blocked by added walls that form a bellows. It is evident that these systems do not tend to reduce the radii of curvature of the skirts and that they are subject to the drawbacks mentioned above.

Another object of the invention consists in provision of an air cushion vehicle skirt whereof the rear part likewise has inflatable projections, the said projections being at least in the lowermost part of small size and small radius of curvature.

According to another characteristic of the invention, an air cushion vehicle is provided wherein suspension is ensured by at least one pressurized air cushion, the air cushion/cushions being at least partly defined by flexible skirts, said skirts comprising parts at the rear part of the vehicle, composed of a horizontally extending compartment of generally quasi-cylindrical horizontal form, inflated to a pressure greater than the pressure of the air cushion, fixed to the rigid structure of the vehicle along two generatrixes and joined to said structure by at least one oblique apron also starting from a generatrix of said compartment, the said compartment being extended downward by finger-like projections of generally flattened truncated form, compactly against each other and substantially vertically or directed to the rear, said projections being in air communication with said inflated compartment.

BRIEF DESCRIPTION OF THE DRAWINGS

There follows a detailed description of preferred embodiments of the invention which is provided only for purposes of illustration and which is to be read together with the accompanying drawings in which.

DETAILED DESCRIPTION OF THE PREFERRED EMBODIMENT

Figure 1:
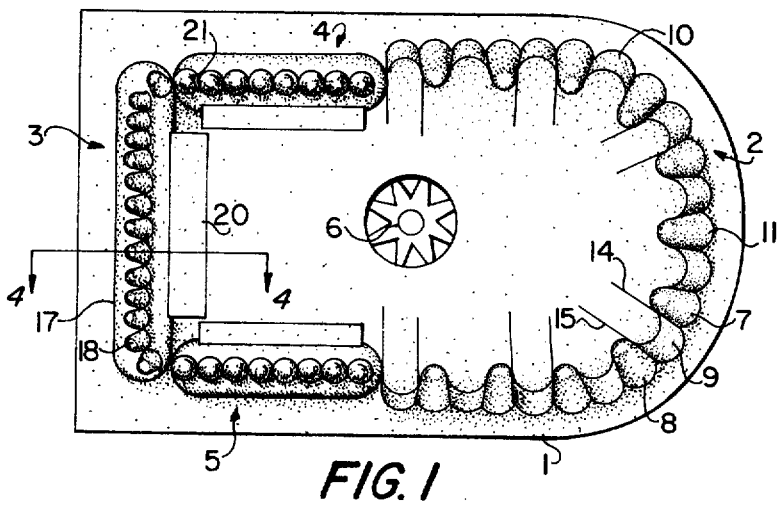
FIG. 1 is a bottom plan view of an air cushion vehicle with a skirt constructed in accordance with the present invention.

Referring now to the drawings, like elements are represented by like numerals throughout the several views.

The air cushion vehicle of FIG. 1 has a base structure 1 to which there are fixed the front skirt system 2 and the rear skirt system comprising the actual rear skirt 3 and two lateral skirts 4 and 5. The whole of these skirts define the air cushion which is fed by a compressor represented schematically at 6.

Figure 2:
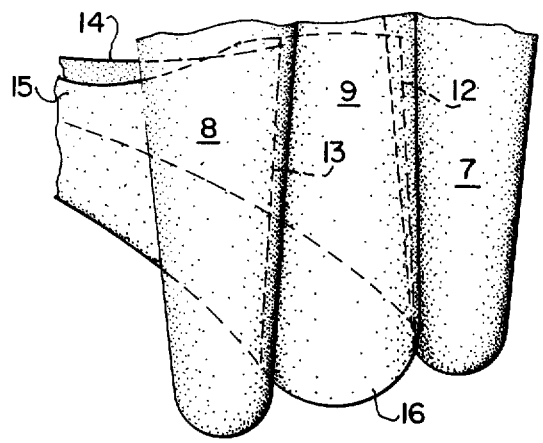
FIG. 2 is a front perspective view of a portion of the skirt structure of FIG. 1.
Figure 3:
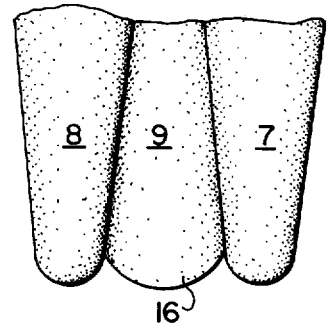
FIG. 3 is a front elevational view of a portion of the skirt of FIG. 1.

The front skirt 2 is formed of inflated finger-like projections 7 and 8, slightly inclined toward the inside, and joined together by aprons such as 9 or 10. FIG. 2 shows a partial perspective of projections 7 and 8 as well as of apron 9, considered as isolated from the adjacent projections. FIG. 3 shows the same projections 7 and 8 as well as apron 9, but as seen from the front. All the inflated projections can be identical. They are, like 7, of generally elongated truncated form enclosed at their lower parts by caps to avoid gaps.

In the arched part at least, of skirt 2, the inflated projections have their axes directed slightly downwardly rearwardly toward the interior, which allows their anterior parts 11 to appear in FIG. 1. Apron 9 of FIG. 2 is integral with projections 7 and 8 along the generatrixes 12 and 13, respectively. On the other hand, it is extended toward the interior of the air cushion by extensions 14 and 15 which are generally triangular in form, joined to structure 1 on the vehicle on the one hand at the top part of generatrixes 12 and 13 and on the other hand at the corner opposite from that side of said triangular parts connected to the projections. Triangular parts 14 and 15 also appear in FIG. 1. Certain aprons such as 10 are different from 9 that they do not include these triangular parts and comprise only the anterior part of apron 9. In FIG. 1, it is assumed that one apron out of each two or three is an apron 9, whereas the others are aprons 10. Other distributions of aprons 9 and 10 are obviously possible. Projections 7 and aprons 9 and 10 are joined to structure 1 by connecting means which may be standard comprising for example a rail added in an appropriate way in structure 1, and tightening means. The inflated projections are associated with inflation means which comprise for example an orifice pierced in the structure, said orifice being fed from a source of compressed air capable of delivering air at a pressure higher than that of the air cushion.

The functioning of front skirt 2, thus inflated is as follows. Firstly, the truncated form of projections 7 gives them a stiffness that decreases slightly from top to bottom, which is regarded as favorable. After passing over a wave, the elasticity of projection 7 is added to the outward pressure exerted by the air cushion to restore skirt 2 rapidly to its position of equilibrium. The forward part 16 of aprons 9 and 10 contributes to the seal of the skirt. Viewed in a horizontal plane, it may be observed that the skirt is formed of a series of elementary surfaces with short radii of curvature. These react with different flexibilities to an external stress thus avoiding transmission of stresses to distant projections. The triangular parts 14 and 15 can converge with the slant of the front part of 2 rearwardly toward the interior of the air cushion, and in case of excess pressure they maintain such inclination. To reduce the air leaks at the bottom of the skirt, parts 16 of aprons 9 and 10 can descend slightly below the level of the lower caps of projections 7. Moreover, air loss orifices may be provided in projections 7, without the air thus lost contributing substantially to the feed of the air cushion. Possible losses increase the damping of oscillation whereof projections 7 may be the seal in certain conditions.

The material of projections 7 and that of aprons 9 and 19 can be one with a base of synthetic fibers (e.g. Tergal, Nylon, etc.) coated with Neoprene, said materials being currently used in the skirts of aerogliders.

Figure 4:
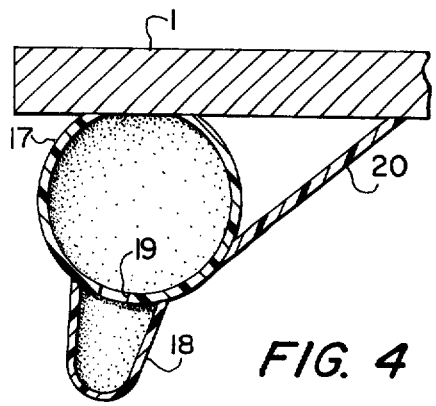
FIG. 4 is a sectional view through the skirt of FIG. 1 taken in the plane 4—4 of FIG. 1.

Rear skirt 3 which is shown in FIG. 4 is made as an inflated horizontally extending compartment 17, at the lower part of which there are fixed short vertical projections 18, of which the general form is that of a flattened truncated cone whose small base constitutes the lower part. As shown in FIG. 4, this small base is terminated by a cap. Projections 18 are inflated to the same pressure as compartment 17 via an orifice such as 19. Compartment 17 is joined to structure 1 of the vehicle by its upper edges as well as by a flat oblique apron 20 which may have a certain elasticity. In practice projections 18 are not strictly vertical, but directly slightly rearwardly toward the outside of the air cushion, i.e. toward the back as shown in FIGS. 1 and 4. Projections 18 are aligned in a row and compactly disposed against each other as shown in FIG. 1. Apron 20 has the dual function of retaining skirt 3 which is subject especially to forces of air pressure of the cushion, and deflecting water downwardly when negotiating waves. This allows the raising of the rear assembly and compression of compartment 17, which then springs behind the wave, returning skirt 3 rapidly downward and thus reducing the loss of suspension air to a minimum. In addition, short projections 18 can separate to allow passage of the mass of water and return to their initial positions. Lateral skirts 4 and 5 of the same type as skirt 3 are provided, i.e., made with a main horizontal compartment similar to 17 and short projections 21 like projections 18. In FIG. 1 it is to be seen that projections 21 are directed substantailly more vertically than projections 18 which are directed toward the rear. On the other hand, it is to be observed that projections 21 are aligned in a straight like whereas projections 18 are disposed along a line that is substantially straight in the middle and joining the lines of projections 21 at its ends. This allows production of a skirt that is entirely closed at the rear. As a variant, part of projections 21 may also be disposed into a curved line connecting that of projections 18.

The system of rear skirts could be limited to skirt 3 and the forward skirt 2 could extend on the sides to the back of the vehicle. However, it is known that air cushion vehicles are subjected to wind and that their direction of movement cannot coincide with their longitudinal axis of symmetry. It is for this reason that it is preferable that the rear skirt likewise comprise lateral parts such as 4 and 5, and that forward skirt 2 not extend past the middle of the vehicle.

Figure 5:
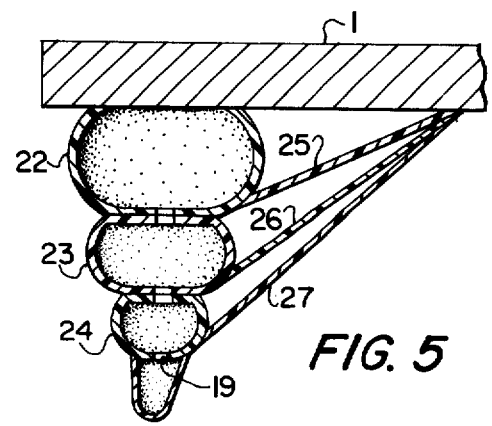
FIG. 5 is a sectional view similar to FIG. 4 but showing a modification thereof.

FIG. 5 shows a modification of the embodiment of skirts 3, 4 and 5 in which compartment 17 is replaced by three interconnected parallel compartments 22, 23 and 24 of decreasing cross-section, with common walls and orifices for air communication. The upper compartment 22 is connected like compartment 17 to base structure 1. Compartments 22, 23 and 24 are joined to structure 1 by tangent aprons 25, 26 and 27 which are similar to apron 20. At the base of compartment 24 there are fixed truncated projections of the same type as projections 18 of FIG. 4.

As far as the generally triangular parts 14 and 15 of aprons 9 are concerned, they may have at the apex opposite generatrixes 12 and 13 eyelets that are connected to structure 1 by ropes or similar fixation means. Parts 14 and 15 may have a curvilinear triangular form, so as not to rub against structure 1 at their upper part.

The ground effect air-cushion vehicle may also comprise lateral keels instead of the side parts of forward skirt 2 and rear skirts 4 and 5, the forward and rear skirts being limited to the forward arched part and rear skirt 3. The invention also concerns an air cushion vehicle in which, in addition to lateral keels there is a central keel. In these vehicles the aprons may be connected to the adjacent keels instead of being joined to the structure.

Although the invention has been described in considerable detail with respect to preferred embodiments thereof, it will be apparent that the invention is capable of numerous modifications and variations apparent to those skilled in the art without departing from the spirit and scope of the invention as defined in the claims.

I claim:

1. An air cushion vehicle comprising:

air cushion means for forming a pressurized air cushion beneath the vehicle to support the vehicle above a surface, said air cushion means being defined at least a portion of the front of the vehicle by a flexible skirt having a forward row formed of a plurality of aligned, generally downwardly extending finger-like projections which are operatively connected at their upper ends to a rigid part of the vehicle, the said projections being of generally truncated form, tapering inwardly towards their lower ends, each projection being enclosed and including means for inflating each projection to a pressure higher than that of the air cushion, each projection being tilted downwardly and inwardly towards the interior of the air cushion, adjacent ones of said projections being joined together by an apron connected to both of said adjacent projections and bowed convex outwardly by the force of said air cushion, at least some of said aprons including extensions extending inwardly toward the interior of the air cushion from said row of projections, a part of said extensions being joined to a rigid part of the vehicle within the area of the air cushion.

2. An air cushion vehicle according to claim 1, said extensions being of essentially triangular form, one side of the said triangular form forming the connection between one side of the apron and one adjacent projection, and the apex of the said triangular form opposite from said one side being the said part of the extension joined to the vehicle.

3. An air cushion vehicle according to claim 2, wherein aprons having said extensions alternate with aprons free of said extensions.

4. An air cushion vehicle according to claim 1, including at least one rearward row of projections in the rear portion of the vehicle defining another portion of said flexible skirt, said other portion having a plurality of aligned, generally downwardly extending finger-like projections which are operatively connected at their upper ends to a rigid part of the vehicle via an intermediate compartment, said rearward projections being of generally truncated form, tapering inwardly downwardly towards their lower ends, each said rearward projection being enclosed and including means for inflating it to a pressure higher than that of the air cushion.

5. An air cushion vehicle according to claim 4, said rearward row being located along the rear of the vehicle, and said rearward projections thereof being tilted downwardly and outwardly away from the interior of the air cushion.

6. An air cushion vehicle according to claim 4, said forward row forming the flexible skirt in the forward half of the vehicle and said rearward row forming the flexible skirt in the rearward half of the vehicle.

7. An air cushion vehicle according to claim 4, said intermediate compartment extending horizontally and connected to a rigid part of the vehicle, said rearward projections extending downwardly from said compartment, the interior of each rearward projection being in communication with the interior of said compartment.

8. An air cushion vehicle according to claim 7, said horizontally extending compartment comprising a plurality of interconnected horizontally extending compartments parallel with each other, each compartment being of a reduced cross-section relative to the compartment immediately above it, and the rearward projections being in fluid communication and extending downwardly from the lowermost of said compartments.

9. An air cushion vehicle comprising:
air cushion means for forming a pressurized air cushion beneath the vehicle to support the vehicle above a surface,
said air cushion being defined at least at the rear of the vehicle by a flexible skirt comprising a rearward row formed of a plurality of interconnected horizontally extending parallel compartments, each compartment being of reduced cross-section relative to the compartment immediately above it, generally downwardly extending finger-like projections which are in fluid communication with and which extend downwardly from the lowermost of said compartments, said projections being of generally truncated form, tapering inwardly towards their lower ends,
and means for inflating the said compartments and the projections to a pressure higher than that of the air cushion,
said projections being tilted downwardly and rearwardly, outwardly away from the interior of the air cushion.

10. An air cushion vehicle comprising:
air cushion means for forming a pressurized air cushion beneath the vehicle to support the vehicle above a surface,
said air cushion means being defined at least at a portion of the front of the vehicle by a flexible skirt having a forward row formed of a plurality of aligned, generally downwardly extending finger-like projections which are operatively connected at their upper ends to a rigid part of the vehicle, the said projections being of generally truncated form, tapering inwardly towards their lower ends,
each projection being enclosed and including means for inflating each projection to a pressure higher than that of the air cushion,
adjacent ones of said projections being joined together by an apron connected to both of said adjacent projections and bowed convex outwardly by the force of said air cushion,
and wherein at least some of said aprons include extensions extending inwardly toward the interior of the air cushion from said row of projections and being of essentially triangular form, one side of the said triangular form forming the connection between one side of the apron and one adjacent projection, and the apex of the said triangular form opposite from said one side connected to the vehicle within the area of the air cushion.

11. An air cushion vehicle according to claim 10, wherein aprons having said extensions alternate with aprons free of said extensions.

* * * * *